April 22, 1924.
G. D. SUNDSTRAND
KNUCKLE JOINT
Filed April 22, 1920
1,491,565
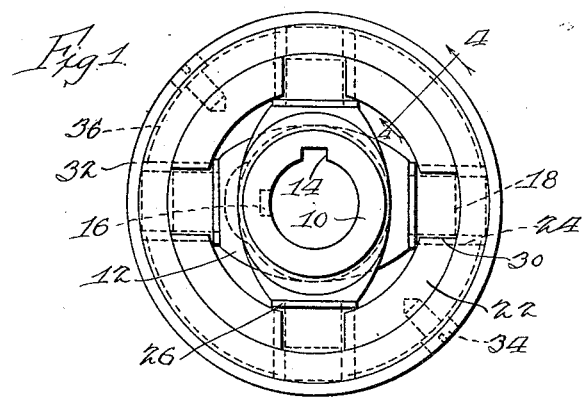
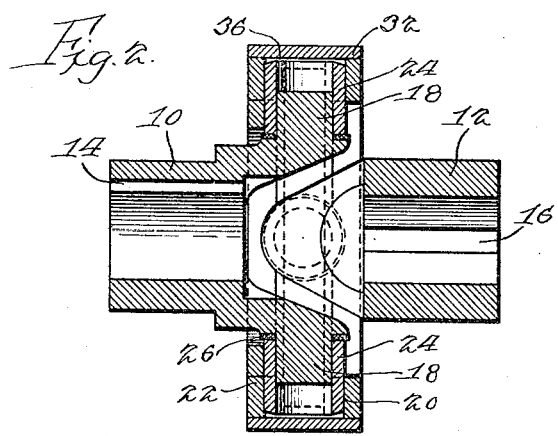
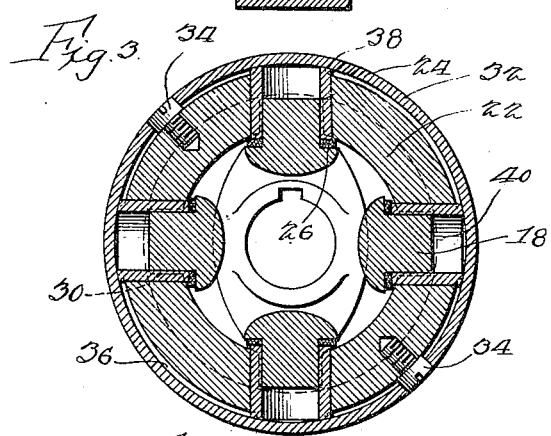
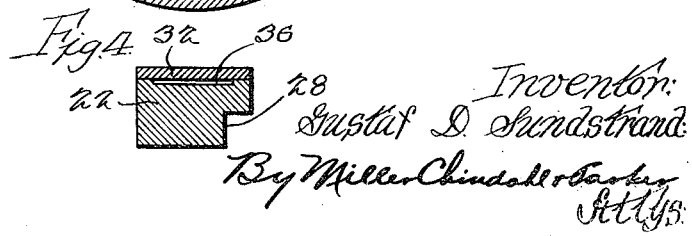
Inventor:
Gustaf D. Sundstrand
By Miller Chindall & Barker
Attys.

Patented Apr. 22, 1924.

1,491,565

UNITED STATES PATENT OFFICE.

GUSTAF DAVID SUNDSTRAND, OF ROCKFORD, ILLINOIS, ASSIGNOR TO SUNDSTRAND ENGINEERING COMPANY, OF ROCKFORD, ILLINOIS, A CORPORATION OF ILLINOIS.

KNUCKLE JOINT.

Application filed April 22, 1920. Serial No. 375,716.

*To all whom it may concern:*

Be it known that I, GUSTAF DAVID SUNDSTRAND, a citizen of the United States, residing at Rockford, in the county of Winnebago and State of Illinois, have invented certain new and useful Improvements in Knuckle Joints, of which the following is a specification.

My invention relates to universal or knuckle joints of the type commonly used in the transmission of power to the rear axle of motor cars and in many other places where it is necessary to transmit rotation to a shaft which must also move while changing its axis.

The principal object of the invention is to simplify the construction of such devices by providing a joint having a minimum number of parts.

Another object is to arrange the parts so that they may have very simple shapes and may therefore be easily manufactured in large quantities.

Further objects and advantages of my invention will become apparent as the description proceeds.

In the accompanying drawings, Figure 1 is an end view of a knuckle joint constructed according to my invention with both shaft sockets in place. Fig. 2 is a central axial section of the parts shown in Fig. 1. Fig. 3 is a transverse central section in the plane of the ring and Fig. 4 is a section on the line 4—4 of Fig. 1.

In the embodiment of my invention selected for illustration, two sleeves or shaft sockets 10 and 12 having keyways 14 and 16 for engagement with the ends of power shafts have each a pair of laterally extending trunnions 18. Four radial holes or trunnion sockets 20 at 90 degree intervals in a ring 22 receive sleeves 24 in which the trunnions are rotatably journaled. Fiber or felt washers 26 may be interposed between the ends of the sleeves 24 and shoulders formed on the trunnions 18 if desired.

The ring 22 has the cross section illustrated in Fig. 4 comprising a wide outer portion and a notch 28 so that the inner portion is narrower. The diameter of the hole drilled in the ring to receive the sleeve 24 is such that the face of the notch 28 is cut away as indicated at 30 in Figs. 1 and 3 forming an aperture of slightly greater dimension than the diameter of the trunnions 18 so that the trunnions may be inserted in place.

In assembling the device the socket 10 is first put in position with its trunnions in the sockets 20 and sleeves 24 are then slipped over its trunnions, then the socket 12 is placed in position and similarly held in place. The sleeves 24 are then fastened in place by sliding a hoop 32 over the ring 22, which hoop engages the outer ends of the sleeves and holds them in place. A pair of diametrically opposed set screws 34 may be employed to fasten the hoop in place and complete the assembly of the device.

The outer surface of the ring 22 is cut away to provide a passageway 36 between the ring and the hoop which serves for the retention of a suitable lubricant, preferably a hard oil, with which the device may be filled through the holes which admit the screws 34, by means of a suitable squirt gun. The outer ends of the sleeves are preferably finished conical or even spherical so as to make a good line contact at 38 in Fig. 3 with the retaining hoop 32. However they are finished, there will be, as indicated in Fig. 2, clearance between their ends and the hoop along the sides of the passageway 36 which will allow the hard oil to flow into the pockets 40 formed by the outer ends of the sleeves, which are not completely filled by the trunnions 18. In assembling the device of course, it will be convenient to fill these pockets before putting the hoop 32 in place, and if a squirt gun is not available they can be readily refilled by slipping the hoop partly off without danger of letting any of the sleeves fall out.

A particular advantage of the construction I employ is that the sockets 10 and 12 are the only irregular shaped pieces employed in the entire construction, as all the other elements comprise solid bodies defined entirely by surfaces of revolution so that they can be turned out in quantities on lathes and automatic screw machines. This is an advantage of great importance as it results in material saving in cost of production and considerable increase in accuracy, compared with the cost and accuracy prevailing where the ring or other parts of the joint must be milled or slotted into irregular shapes.

Another advantage is that a single set screw is sufficient to fasten the entire device in assembled position, although I prefer to employ two, and that the ends of the screws may and preferably should be countersunk as shown so that the finished joint has no projecting part which could catch a stationary element or the clothes of a workman and cause damage or injury.

While I have illustrated and described in detail a preferred embodiment of my invention, it should be clearly understood that the disclosure is merely for purposes of illustration and that many modifications and variations will naturally occur to those skilled in the art. I aim in the subjoined claims to cover all such legitimate variations and modifications.

I claim as my invention:

1. In a knuckle joint, in combination, a ring, radial passageways in said ring, sleeves in said passageways, trunnions journaled in said sleeves, and terminating short of the outer ends thereof whereby a pocket is formed for the retention of lubricant, and a retaining hoop encircling said ring and sleeves to hold said sleeves in said ring and said lubricant in said pockets, said ring and hoop being shaped to provide an enclosed annular passageway between them communicating with said pockets.

2. In a knuckle joint, in combination, a ring, radial passageways in said ring, sleeves in said passageways, trunnions journaled in said sleeves, and terminating short of the outer ends thereof whereby a pocket is formed for the retention of lubricant, a retaining hoop encircling said ring and sleeves to hold the latter in said ring and said lubricant in said pockets, said ring and hoop being shaped to provide an enclosed annular passageway between them communicating with said pockets, and fastening members adapted to maintain all said parts in assembled relation by preventing axial displacement of said hoop from said ring, said fastening members passing through said annular passageway whereby upon removal thereof, lubricant may be supplied to said passageway.

In testimony whereof, I have hereunto set my hand.

GUSTAF DAVID SUNDSTRAND.